(12) United States Patent
Chang

(10) Patent No.: US 11,221,773 B2
(45) Date of Patent: Jan. 11, 2022

(54) METHOD AND APPARATUS FOR PERFORMING MAPPING INFORMATION MANAGEMENT REGARDING REDUNDANT ARRAY OF INDEPENDENT DISKS

(71) Applicant: Silicon Motion Inc., Hsinchu County (TW)

(72) Inventor: An-Nan Chang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/297,737

(22) Filed: Mar. 11, 2019

(65) Prior Publication Data
US 2020/0150887 A1    May 14, 2020

(30) Foreign Application Priority Data

Nov. 8, 2018  (TW) .................................. 10713966.1

(51) Int. Cl.
| G06F 12/00 | (2006.01) |
| G06F 3/06 | (2006.01) |
| G06F 16/17 | (2019.01) |
| G06F 1/30 | (2006.01) |

(52) U.S. Cl.
CPC .............. *G06F 3/0631* (2013.01); *G06F 1/30* (2013.01); *G06F 3/0619* (2013.01); *G06F 3/0689* (2013.01); *G06F 16/1734* (2019.01)

(58) Field of Classification Search
CPC ...... G06F 3/0631; G06F 16/1734; G06F 1/30; G06F 3/0619; G06F 3/0689
See application file for complete search history.

(56) References Cited

U.S. PATENT DOCUMENTS

| 9,448,919 | B1* | 9/2016 | Boyle ................... G06F 3/0652 |
| 10,318,495 | B2* | 6/2019 | Talagala ................ G06F 3/0616 |
| 2007/0033376 | A1* | 2/2007 | Sinclair ................. G06F 3/0643 |
| | | | 711/203 |

(Continued)

FOREIGN PATENT DOCUMENTS

| CN | 105975358 A | 9/2016 |
| JP | 2000010738 A * | 1/2000 .......... G06F 11/1096 |

(Continued)

*Primary Examiner* — Shawn X Gu
*Assistant Examiner* — Mohammad S Hasan
(74) *Attorney, Agent, or Firm* — Winston Hsu

(57) ABSTRACT

A method and apparatus for performing mapping information management regarding a RAID are provided. The method includes: writing data into a data region of the RAID in a redirect-on-write (ROW) manner, and recording mapping information between logical addresses of the data and protected-access-unit addresses (p-addresses) of protected access units in the data region into a logical-address-to-p-address (L2p) table within a table region of the RAID; when partial data of the data is updated, maintaining an updating list including a set of L2p table entries for the partial data in a RAM, and maintaining a recovery log corresponding to the updating list in a log region of the RAID, for power failure recovery; and according to the updating list, detecting whether a number of same-location L2p table entries in the set of L2p table entries reaches a predetermined threshold, to selectively update the L2p table with the same-location L2p table entries.

7 Claims, 6 Drawing Sheets

(56) References Cited

U.S. PATENT DOCUMENTS

| | | | |
|---|---|---|---|
| 2009/0077558 A1* | 3/2009 | Arakawa | G06F 1/3221 |
| | | | 718/102 |
| 2010/0205369 A1* | 8/2010 | Chang | G06F 3/064 |
| | | | 711/113 |
| 2011/0319094 A1* | 12/2011 | Usui | G01S 5/0027 |
| | | | 455/456.1 |
| 2013/0086342 A1 | 4/2013 | Beeken | |
| 2013/0332648 A1* | 12/2013 | Kandiraju | G06F 12/0246 |
| | | | 711/103 |
| 2015/0046665 A1* | 2/2015 | Higgins | G06F 3/0659 |
| | | | 711/158 |
| 2015/0269025 A1* | 9/2015 | Krishnamurthy | G06F 3/0689 |
| | | | 714/6.24 |
| 2015/0379038 A1* | 12/2015 | Nikolov | G06F 16/951 |
| | | | 707/622 |
| 2016/0132429 A1* | 5/2016 | Lin | G06F 3/0679 |
| 2018/0232314 A1* | 8/2018 | Lin | G06F 3/0659 |
| 2019/0065387 A1* | 2/2019 | Duzly | G06F 12/0246 |
| 2019/0340134 A1* | 11/2019 | Haswell | G06F 12/1018 |
| 2020/0042244 A1* | 2/2020 | Yang | G06F 11/1076 |

FOREIGN PATENT DOCUMENTS

| | | |
|---|---|---|
| TW | 201409232 A | 3/2014 |
| TW | I516931 B | 1/2016 |
| TW | I544326 B | 8/2016 |
| TW | I550407 B | 9/2016 |
| WO | 2018/154697 A1 | 8/2018 |

* cited by examiner

METHOD AND APPARATUS FOR PERFORMING MAPPING INFORMATION MANAGEMENT REGARDING REDUNDANT ARRAY OF INDEPENDENT DISKS

BACKGROUND OF THE INVENTION

1. Field of the Invention

The present invention is related to storage systems, and more particularly, to a method and apparatus for performing mapping information management regarding a redundant array of independent disks (RAID).

2. Description of the Prior Art

A redundant array of independent disks (RAID) may be implemented in a server. Data therein can obtain a corresponding level of protection through various types of RAID schemes. For example, for the purpose of data backup, the server may be designed to have a copy-on-write (COW) architecture. Due to the characteristic(s) of the COW architecture, performance of the server may degrade over time. To prevent this problem, the server may be designed to have a redirect-on-write (ROW) architecture. This may result in some problems or side effects, however. Thus, there is a need for a novel method and associated apparatus to guarantee that a storage system is able to correctly operate under various conditions.

SUMMARY OF THE INVENTION

An objective of the present invention is to provide a method and apparatus for performing mapping information management regarding a redundant array of independent disks (RAID), to solve the problems of the related art.

Another objective of the present invention is to provide a method and apparatus for performing mapping information management regarding a RAID, to guarantee that a storage system is able to correctly operate under various conditions.

Yet another objective of the present invention is to provide a method and apparatus for performing mapping information management regarding a RAID, to solve the related art problems without introducing any side effect or in a way that is less likely to introduce side effects.

At least one embodiment of the present invention provides a method for performing mapping information management regarding a RAID. The method may comprise: writing data into a data region of the RAID in a redirect-on-write (ROW) manner, and recording mapping information between logical addresses of the data and respective protected-access-unit addresses (p-addresses) of protected access units in the data region into a logical-address-to-p-address (L2p) table within a table region of the RAID, wherein subsets of the data are written into the protected access units, respectively; in response to partial data of the data being updated, maintaining an updating list comprising a set of L2p table entries for the partial data in a random access memory (RAM), and maintaining a recovery log corresponding to the updating list in a log region of the RAID, for power failure recovery; and according to the updating list, detecting whether a number of at least two same-location L2p table entries in the set of L2p table entries reaches a predetermined threshold, to selectively update the L2p table with the aforementioned at least two same-location L2p table entries, wherein the aforementioned at least two same-location L2p table entries represent L2P table entries within the set of L2P table entries that are supposed to be stored into a same protected access unit within the table region.

According to some embodiments, the present invention further provides a storage system operating according to the aforementioned method, wherein the storage system comprises the RAID.

At least one embodiment of the present invention provides an apparatus for performing mapping information management regarding a RAID. The apparatus comprises a processing circuit, where the processing circuit is positioned in a storage system, and is arranged to control operations of the storage system. The operations of the storage apparatus may comprise: writing data into a data region of the RAID in a ROW manner, and recording mapping information between logical addresses of the data and respective p-addresses of protected access units in the data region into an L2p table within a table region of the RAID, wherein subsets of the data are written into the protected access units, respectively; in response to partial data of the data being updated, maintaining an updating list comprising a set of L2p table entries for the partial data in a RAM, and maintaining a recovery log corresponding to the updating list in a log region of the RAID, for power failure recovery; and according to the updating list, detecting whether a number of at least two same-location L2p table entries in the set of L2p table entries reaches a predetermined threshold, to selectively update the L2p table with the aforementioned at least two same-location L2p table entries, wherein the aforementioned at least two same-location L2p table entries represent L2P table entries within the set of L2P table entries that are supposed to be stored into a same protected access unit within the table region.

The present invention method and apparatus can guarantee that the storage system is able to normally operate under various conditions. In addition, the present invention method and apparatus provide a powerful mapping information managing mechanism. Thus, various purposes can be achieved, such as optimal performance, high security and budget control. Additionally, the present invention method and apparatus can solve the related art problems without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
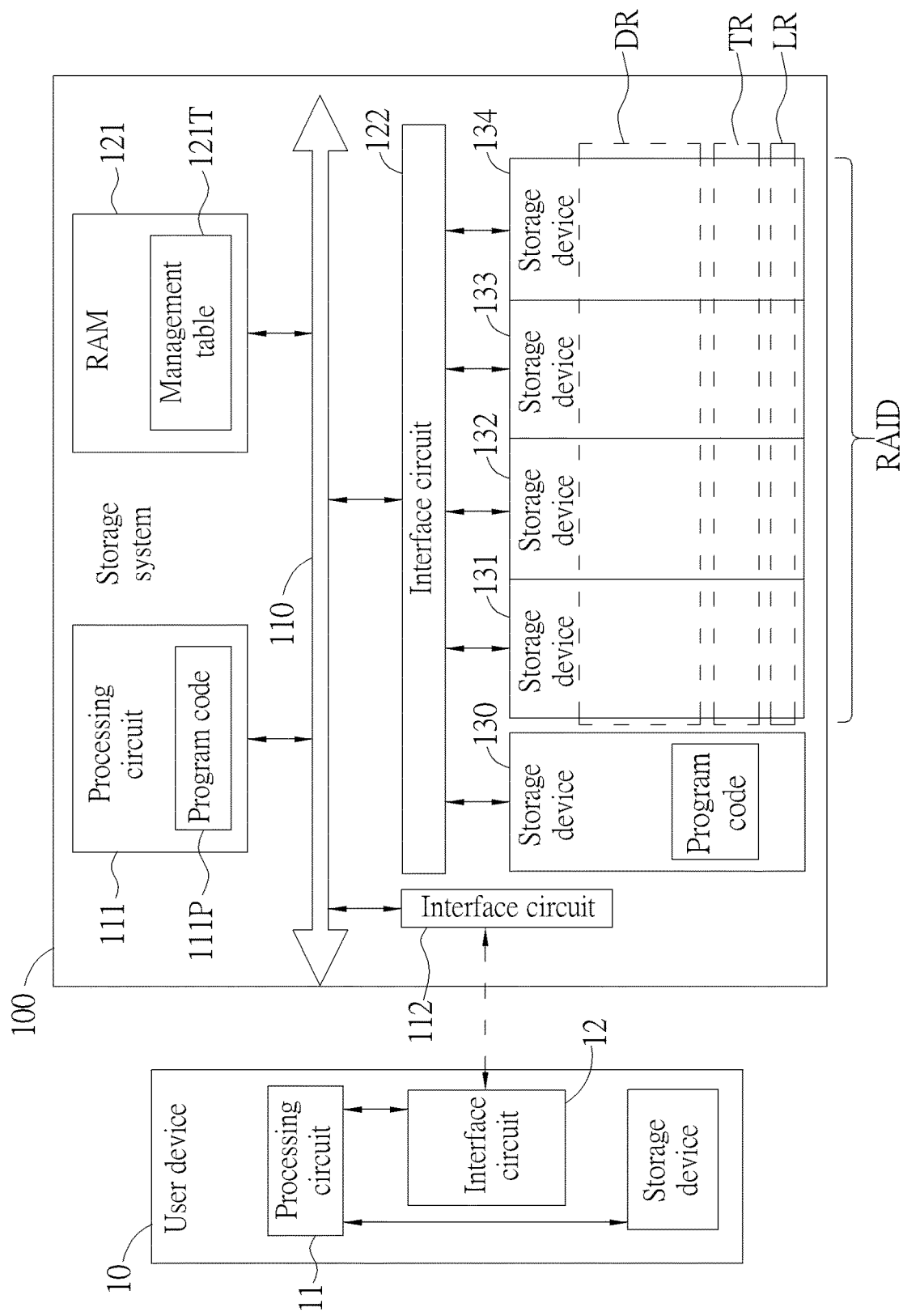
FIG. 1 is a diagram illustrating a storage system and a user device according to an embodiment of the present invention.

FIG. 1 is a diagram illustrating a storage system 100 and a user device 10 according to an embodiment of the present invention. The user device 10 may comprise a processing circuit 11 (e.g. at least one processor and associated circuits), and may further comprise an interface circuit 12 and a storage device coupled to the processing circuit 11. The storage system 100 may comprise a processing circuit 111 (e.g. at least one processor and associated circuits), and may further comprise interface circuits 112 and 122 and random access memory (RAM) 121 coupled to the processing circuit 111 through a bus 110, and storage devices {130, 131, 132, 133, 134}, such as hard disk drives and/or solid-state drives, may be installed in the storage system 100 through the interface circuit 122 to form a RAID, where a program code 111P executed in the processing circuit 111 may be read from the storage device 130 (e.g. a system disk), and may maintain (e.g. build, store, and/or update) a management table 121T within the RAM 121 in order to perform related operations of the present invention, to manage a data region DR, a table region TR and a log region LR. Each of the interface circuits 12 and 112 may be implemented as a wired and/or wireless network interface, to allow the storage system 100 to exchange information with the user device 10. A user may access (e.g. read or write) user data in the storage system 100 through the user device 10. Examples of the user device 10 may include, but are not limited to: a multifunctional mobile phone, a tablet, a wearable device and a personal computer (such as a desktop computer and a laptop computer). Examples of the storage system 100 may include, but are not limited to: a server such as a storage server. According to some embodiments, the architecture of the storage system 100 may vary. For example, the program code 111P may be implemented through an exclusive hardware installed in the interface circuit 122, to perform the related operations of the present invention.

Figure 2:
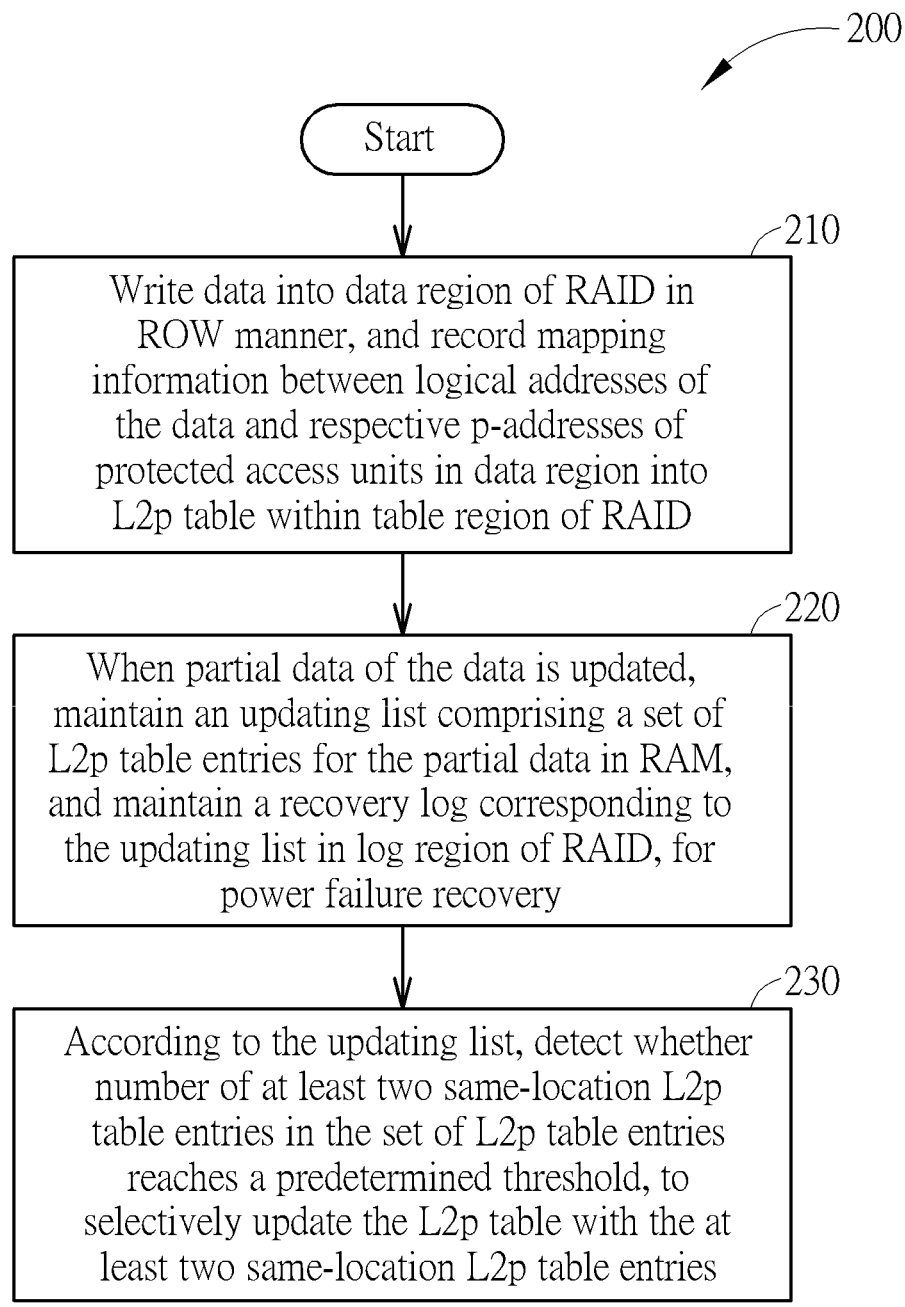
FIG. 2 is a flowchart illustrating a method for performing mapping information management regarding a RAID (such as that shown in FIG. 1) according to an embodiment of the present invention.

FIG. 2 is a flowchart illustrating a method 200 for performing mapping information management regarding a RAID (such as the RAID shown in FIG. 1) according to an embodiment of the present invention. The method 200 may be applied to the storage system 100, the processing circuit 111 that executes the program code 111P, and related components, which are shown in FIG. 1.

In Step 210, the storage system 100 (e.g. the processing circuit 111) writes data into the data region DR of the RAID in a redirect-on-write (ROW) manner, and records mapping information between logical addresses of the data and respective protected-access-unit addresses (p-addresses) of protected access units in the data region DR into a logical-address-to-p-address (L2p) table within the table region TR of the RAID, wherein subsets of the data are written into the protected access units, respectively.

In Step 220, when partial data of the data is updated, the storage system 100 (e.g. the processing circuit 111) maintains an updating list comprising a set of L2p table entries for the partial data in the RAM 121, and maintains a recovery log corresponding to the updating list in the log region LR of the RAID, for power failure recovery.

In Step 230, according to the updating list, the storage system 100 (e.g. the processing circuit 111) detects whether a number of at least two same-location L2p table entries in the set of L2p table entries reaches a predetermined threshold (e.g. 2, or any of other predetermined values), to selectively update the L2p table with the aforementioned at least two same-location L2p table entries, wherein the aforementioned at least two same-location L2p table entries represent L2P table entries within the set of L2P table entries that are supposed to be stored into a same protected access unit within the table region TR, such as the L2P table entries that are within the set of L2P table entries and should be stored into the same protected access unit within the table region TR. For example, an L2p table entry may be an updated version of a portion of the L2p table, such as that for updating the L2p table, and may comprise a latest storage location corresponding to a ROW operation.

According to this embodiment, in Step 220, when the partial data of the data is updated, the storage system 100 (e.g. the processing circuit 111) may correspondingly record auxiliary information in the updating list in order to detect whether the aforementioned at least two same-location L2p table entries exist in the set of L2p table entries. For example, the auxiliary information may indicate a set of recovery log entries within the recovery log, and the set of recovery log entries may point toward a set of protected access units within the table region TR, to guide the L2p table to be updated according to the set of L2p table entries, but the present invention is not limited thereto.

According to some embodiments, the updating list may comprise a set of pointers respectively corresponding to the set of L2p table entries, the set of pointers may respectively point toward a set of recovery log entries within the recovery log, and the set of recovery log entries may point toward a set of protected access units within the table region TR. For example, the L2p table may comprise at least one sub-table that is supposed to be updated with the set of L2p table entries, such as one or more sub-tables that should be updated with the set of L2p table entries, and a location of the aforementioned at least one sub-table in the table region may correspond to the set of protected access units. In another example, the L2p table may comprise at least one sub-table that is supposed to be updated with the set of L2p table entries, such as one or more sub-tables that should be updated with the set of L2p table entries. Additionally, the updating list may comprise at least two pointers respectively corresponding to the aforementioned at least two same-location L2p table entries, the aforementioned at least two pointers may respectively point toward a same recovery log entry within the recovery log, and the same recovery log entry may point toward the same protected access unit within the table region TR.

Figure 3:
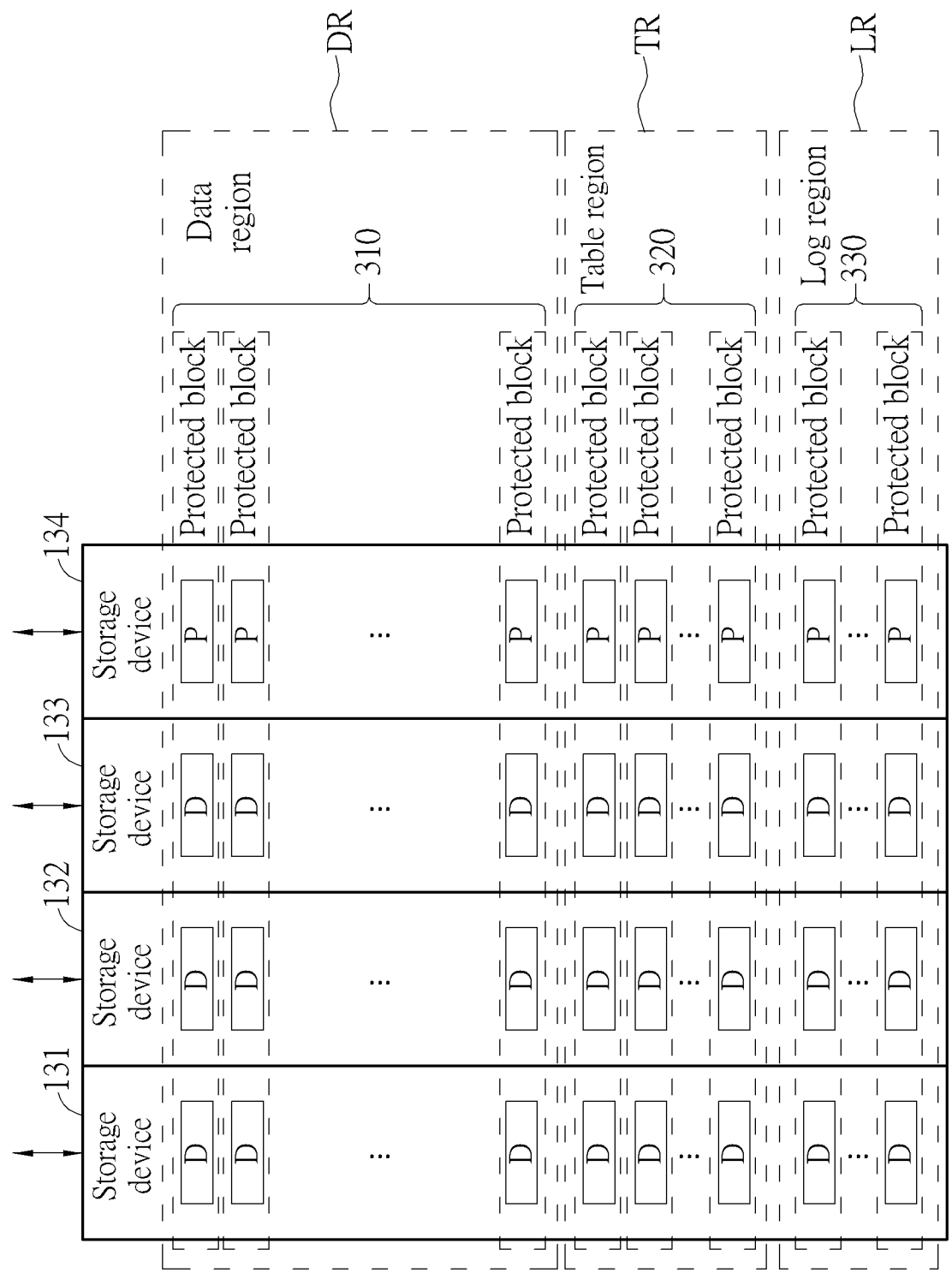
FIG. 3 illustrates a plurality of protected access units involved in the method shown in FIG. 2 according to an embodiment of the present invention, where examples of the plurality of protected access units may be protected blocks.

FIG. 3 illustrates a plurality of protected access units used in the method 200 shown in FIG. 2 according to an embodiment of the present invention, where examples of the plurality of protected access units may be protected blocks 310, 320 and 330, but the present invention is not limited thereto. For example, regarding any protected block within any of the protected blocks 310, 320 and 330, a symbol "D" may represent data within the protected block, and a symbol "P" may represent a parity code within the protected block. Through the parity code P, the data D can be protected. According to some embodiments, a type and/or a protection level of the RAID may vary, where user data can be protected with a corresponding type and/or level of protection.

Figure 4:
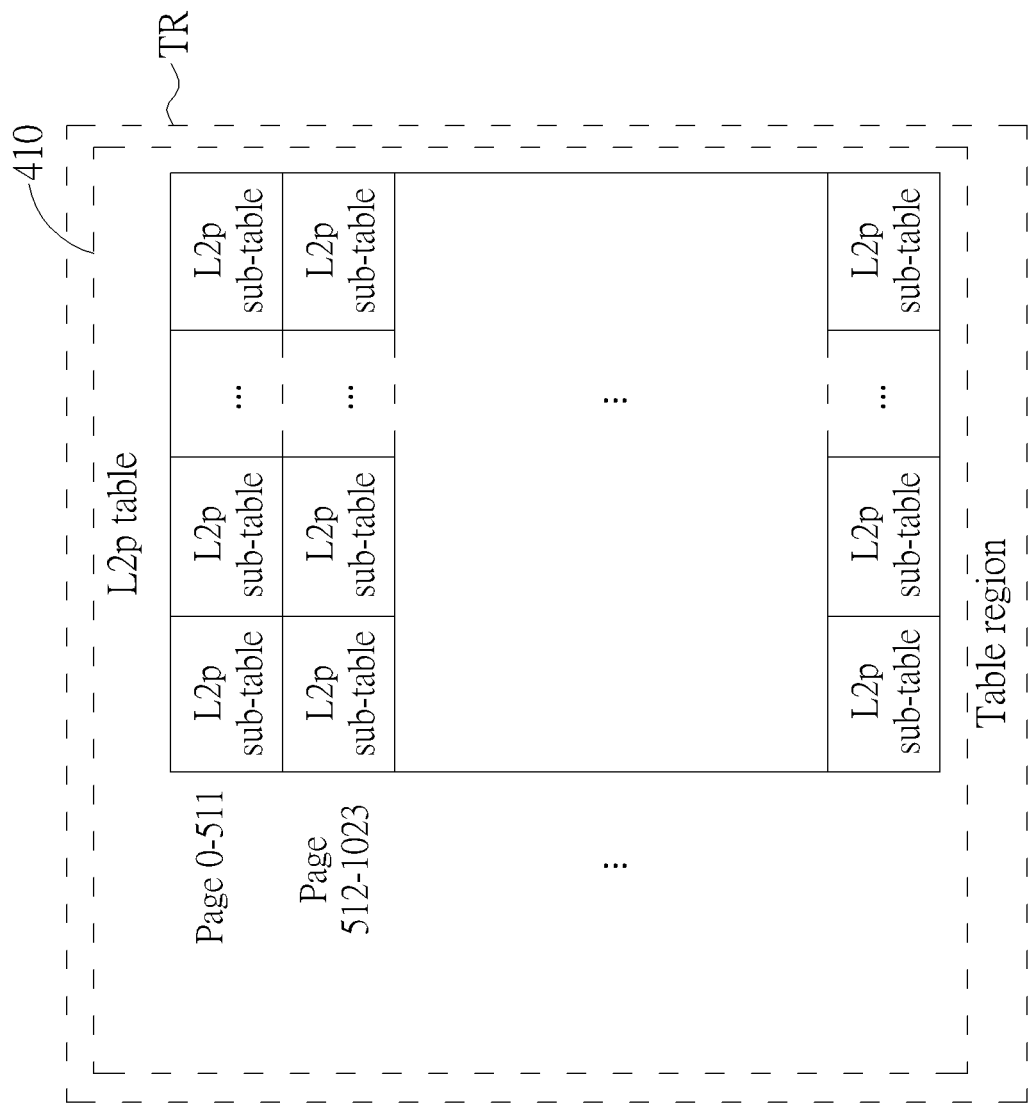
FIG. 4 illustrates an L2p table used in the method shown in FIG. 2 according to an embodiment of the present invention.

FIG. 4 illustrates an L2p table 410 used in the method 200 shown in FIG. 2 according to an embodiment of the present invention, and the L2p table 410 may be taken as an example of the L2p table mentioned above. The L2p table 410 may comprise multiple L2p sub-tables, where the first row of L2p sub-tables may respectively map pages 0-511 (more particularly, logical addresses 0-511) to respective storage locations (e.g. some protected access units such as protected blocks), and the second row of L2p sub-tables may respectively map pages 512-1023 (more particularly, logical addresses 512-1023) to respective storage locations (e.g. some protected access units such as protected blocks), but the present invention is not limited thereto. According to some embodiments, the storage locations may be regarded as ROW locations.

Figure 5:
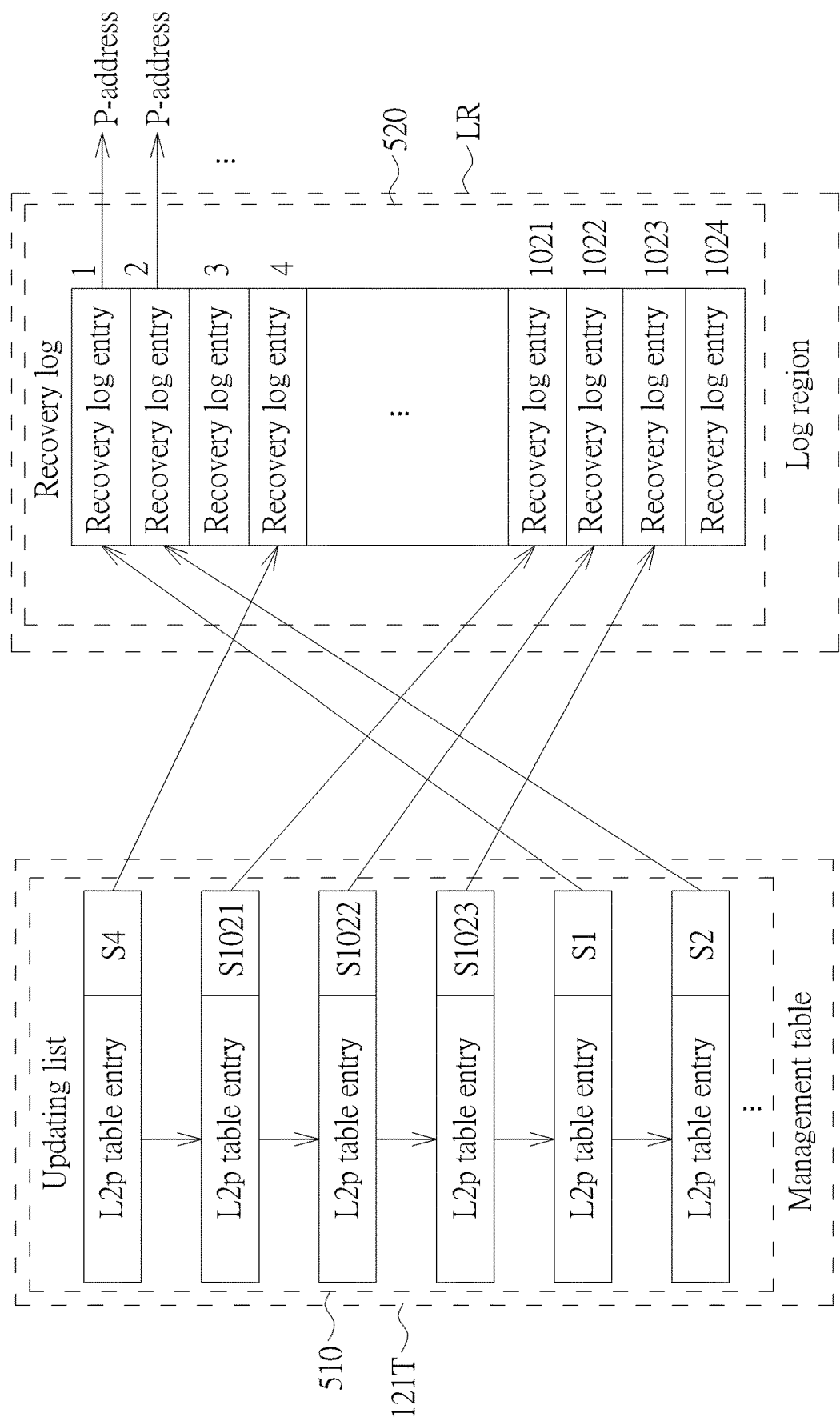
FIG. 5 illustrates an updating list and a recovery log involved in the method shown in FIG. 2 according to an embodiment of the present invention.

FIG. 5 illustrates an updating list 510 and a recovery log 520 involved in the method 200 shown in FIG. 2 according to an embodiment of the present invention, where auxiliary information {S4, S1021, S1022, S1023, S1, S2, ... } may be pointers. For brevity, similar descriptions for this embodiment are not repeated in detail here.

Figure 6:
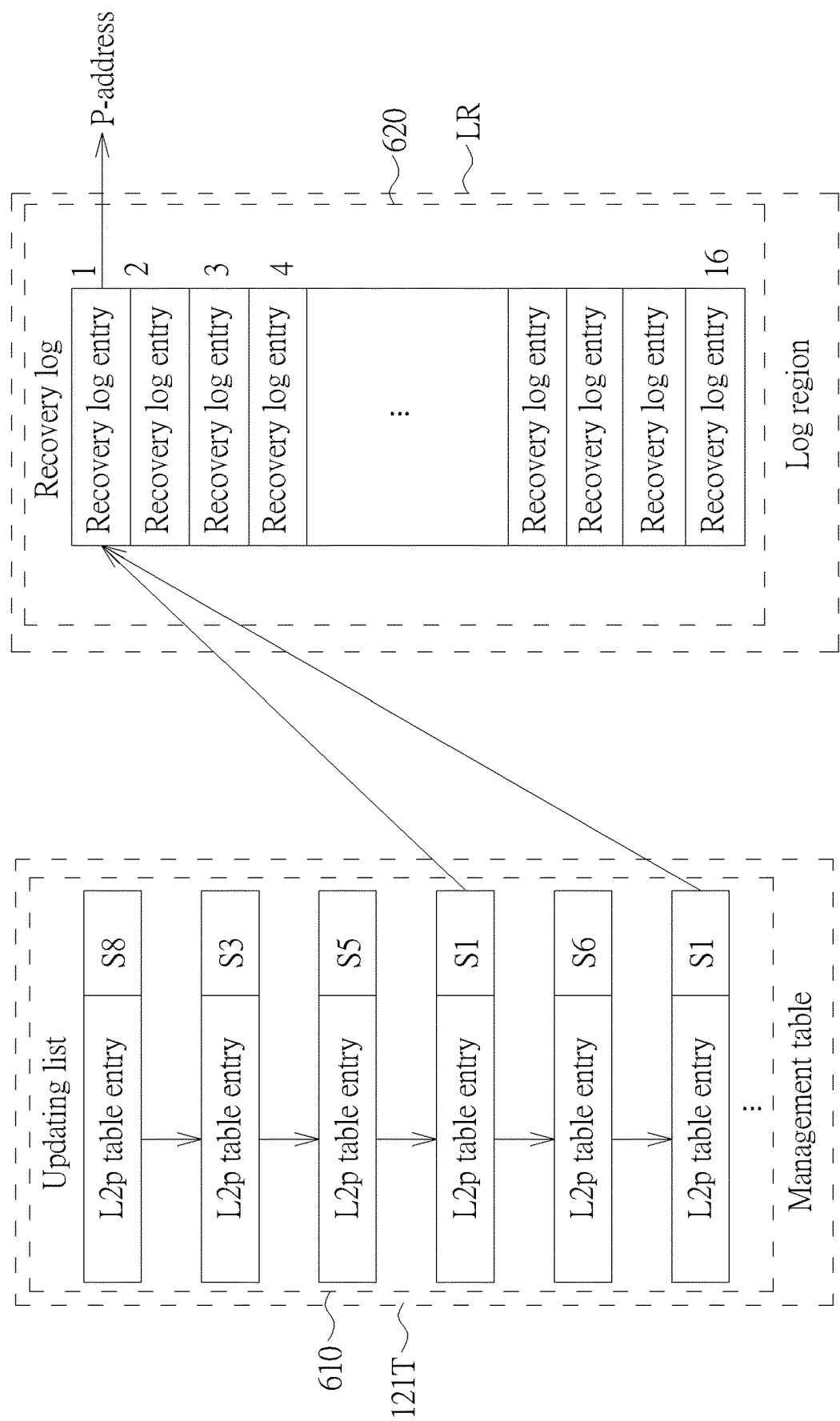
FIG. 6 illustrates an updating list and a recovery log involved in the method shown in FIG. 2 according to another embodiment of the present invention.

FIG. 6 illustrates an updating list 610 and a recovery log 620 involved in the method 200 shown in FIG. 2 according to another embodiment of the present invention, where auxiliary information {S8, S3, S5, S1, S6, S1, ... } may be pointers. For example, in Step 230, when the auxiliary information S1 appears twice, the storage system 100 (e.g. the processing circuit 111) may detect that the number of the aforementioned at least two same-location L2p table entries (e.g. the two L2p table entries comprising the auxiliary information S1 shown in FIG. 6) reaches the predetermined threshold (e.g. 2), and therefore update the L2p table with the aforementioned at least two same-location L2p table entries. As a result, the storage system 100 updates the L2p table ahead of time rather than waiting for the recovery log 620 to become full. Therefore, the present invention apparatus can prevent an overall performance from being degraded due to the operations of updating most or all portions of the L2p table. The present invention method and apparatus can guarantee that the storage system is able to normally operate under various conditions. In addition, the present invention method and apparatus provide a powerful mapping information managing mechanism, which can achieve various purposes such as optimal performance, high security and budget control. Additionally, the present invention method and apparatus can solve the related art problems without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing mapping information management regarding a redundant array of independent disks (RAID), comprising:
writing data into a data region of the RAID in a redirect-on-write (ROW) manner, wherein the data being written is written into at least one of a plurality of protected access units in the data region, and recording mapping information between logical addresses of the data being written into the at least one protected access units and respective protected-access-unit addresses (p-addresses) of the protected access units into a logical-address-to-p-address (L2p) table within a table region of the RAID;
in response to any of the written data being updated, maintaining an updating list comprising updated L2p table entries respectively corresponding to the updated data and further comprising auxiliary information respectively corresponding to the updated data in a random access memory (RAM), and maintaining a recovery log comprising the updated data in a log region of the RAID for power failure recovery, wherein the recovery log comprises a plurality of recovery log entries, each recovery log entry location corresponds to a respective protected access unit within the data region, and a value of the auxiliary information indicates a specific recovery log entry location; and
when auxiliary information having a same value stored to the updating list reaches a predetermined threshold being at least two, determining that a number of L2p table entries corresponding to a same recovery log entry location reaches the predetermined threshold, using the auxiliary information having the same value to access the L2p table entries corresponding to the same recovery log entry location in the updating list, and updating the L2p table with the L2p table entries in the updating list corresponding to the same recovery log entry location, wherein said L2p table entries corresponding to the same recovery log entry location represent updated data that are supposed to be stored into a same protected access unit within the table region;
wherein the predetermined threshold is independent of a capacity of the updating list and independent of an overall data size of the updating list.

2. The method of claim 1, wherein the updating list comprises pointers respectively corresponding to the updated L2p table entries, and the pointers respectively point toward recovery log entries within the recovery log.

3. The method of claim 2, wherein the L2p table comprises at least one sub-table that is supposed to be updated with the updated L2p table entries; and a location of said at least one sub-table in the table region corresponds to the protected access units.

4. The method of claim 1, wherein the L2p table comprises at least one sub-table that is supposed to be updated with the updated L2p table entries.

5. The method of claim 1, wherein the updating list comprises at least two pointers respectively corresponding to said at least two same-location L2p table entries, said at least two pointers respectively point toward a same recovery log entry within the recovery log, and the same recovery log entry points toward the same protected access unit within the table region.

6. A storage system operating according to the method of claim 1, wherein the storage system comprises the RAID.

7. An apparatus for performing mapping information management regarding a redundant array of independent disks (RAID), comprising:
a processing circuit, positioned in a storage system, arranged to control operations of the storage system, wherein the operations of the storage system comprise:
writing data into a data region of the RAID in a redirect-on-write (ROW) manner, wherein the data being written is written into at least one of a plurality of protected access units in the data region, and recording mapping information between logical addresses of the data being written into the protected access units and respective protected-access-unit addresses (p-addresses) of the at least one protected access units into a logical-address-to-p-address (L2p) table within a table region of the RAID;
in response to-any of the written data being updated, maintaining an updating list comprising updated L2p table entries respectively corresponding to the updated data and further comprising auxiliary information respectively corresponding to the updated data in a random access memory (RAM) and maintaining a recovery log comprising the updated data in a log region of the RAID for power failure recovery, wherein the recovery log comprises a plurality of recovery log entries, each recovery log entry location corresponds to a respective protected access unit within the data region, and a value of the auxiliary information indicates a specific recovery log entry location; and when auxiliary information having a same value stored to the updating list reaches a predetermined threshold being at least two, determining that a number of L2p table entries corresponding to a same recovery log entry location reaches the predetermined threshold, using the auxiliary information having the same value to access the L2p table entries corresponding to the same recovery log entry location in the updating list, and updating the L2p table with the L2p table entries in the updating list corresponding to the same recovery log entry location, wherein said L2p table entries corresponding to the same recovery log entry location represent updated data that are supposed to be stored into a same protected access unit within the table region;

wherein the predetermined threshold is independent of a capacity of the updating list and independent of an overall data size of the updating list.

* * * * *